US012602260B2

(12) United States Patent
Jha et al.

(10) Patent No.: US 12,602,260 B2
(45) Date of Patent: Apr. 14, 2026

(54) COMPUTER-BASED PROVISIONING OF CLOUD RESOURCES

(71) Applicant: International Business Machines Corporation, Armonk, NY (US)

(72) Inventors: Saurabh Jha, White Plains, NY (US); Larisa Shwartz, Greenwich, CT (US); Frank Bagehorn, Dottikon (CH)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 18/185,134

(22) Filed: Mar. 16, 2023

(65) Prior Publication Data

US 2024/0311201 A1 Sep. 19, 2024

(51) Int. Cl.
*G06F 9/50* (2006.01)

(52) U.S. Cl.
CPC ............ *G06F 9/505* (2013.01); *G06F 9/5072* (2013.01)

(58) Field of Classification Search
CPC ................................ G06F 9/505; G06F 9/5072
See application file for complete search history.

(56) References Cited

U.S. PATENT DOCUMENTS

| | | | |
|---|---|---|---|
| 10,749,773 B2 | 8/2020 | Hockett | |
| 10,986,013 B1* | 4/2021 | Theimer | ............. H04L 41/0604 |
| 11,424,989 B2 | 8/2022 | Jeuk | |
| 11,481,616 B2 | 10/2022 | Spryn | |
| 2016/0085664 A1* | 3/2016 | Horovitz | ............... G06F 11/261 |
| | | | 714/38.1 |

| | | | |
|---|---|---|---|
| 2019/0113572 A1* | 4/2019 | Bose | ...................... G06F 30/327 |
| 2020/0218579 A1 | 7/2020 | D M | |
| 2023/0195444 A1* | 6/2023 | Vohra | ...................... G06F 9/455 |
| | | | 717/172 |
| 2024/0176726 A1* | 5/2024 | Lemberg | ............. G06F 11/3636 |

FOREIGN PATENT DOCUMENTS

| | | |
|---|---|---|
| AU | 20211025694 A4 | 7/2021 |
| KR | 20180098798 A | 9/2018 |
| KR | 20190076693 A | 7/2019 |
| KR | 1022453411 A | 4/2021 |

OTHER PUBLICATIONS

Shoeybi, et al. "Megatron-Im: Training multi-billion parameter language models using model parallelism." arXiv preprint arXiv:1909. 08053 (2019), arXiv: 1909.08053v4 Mar. 13, 2020, 15 pages. https://arxiv.org/pdf/1909.08053.pdf.

* cited by examiner

*Primary Examiner* — Sisley N Kim
(74) *Attorney, Agent, or Firm* — Joseph P. Curcuru

(57) ABSTRACT

In an approach to improve enhancing the provisioning cloud resources, embodiments receive a set of potential cloud resource providers and predict a performance for a distributed workload on each potential provider of the set according to a machine learning model. Additionally, embodiments inject fault into the set of potential cloud resource providers and measure an impact of the injected fault upon system performance. Embodiments utilize the injected fault to create a system intervention to ensure that the system intervention is carried out on a network in predetermined system. Further, embodiments provision the distributed workload among the potential cloud resource providers according to dynamic conditions output by the set of potential cloud resources based on the measured impact of the injected fault.

20 Claims, 5 Drawing Sheets

COMPUTER-BASED PROVISIONING OF CLOUD RESOURCES

BACKGROUND OF THE INVENTION

The present invention relates generally to cloud computing, and more particularly to the field of improving cloud services in a single cloud and/or multi-cloud computer.

As defined by the National Institute of Standards and Technology (NIST), "cloud computing is a model for enabling ubiquitous, convenient, on-demand network access to a shared pool of configurable, computing resources (e.g., networks, servers, storage, applications, and services) that can be rapidly provisioned and released with minimal management effort or service provider interaction. Five essential characteristics define a cloud computing environment and differentiate it from a traditional computing environment: (i) "on demand self-service" where a customer can provision computing resources without requiring interaction with the service provider, (ii) "broad network access" where computing resources are provided over the network and accessed through various platforms, (iii) "resource pooling" where computing resources are pooled to serve multiple customers with resources dynamically assigned according to customer need, (iv) "rapid elasticity" where resources can be rapidly provisioned to scale up or down based on real-time need, and (v) "measured service" where resource usage can be monitored and controlled using a metering capability. Cloud service providers are companies that establish public clouds, manage private clouds, or offer on-demand cloud computing components (also known as cloud computing services) like Infrastructure-as-a-Service (IaaS), Platform-as-a-Service (PaaS), and Software-as-a-Service (SaaS). Cloud services can reduce business process costs when compared to on-premise information technology (IT). These clouds aren't usually deployed as a standalone infrastructure solution, but rather as part of a hybrid cloud.

SUMMARY

Embodiments of the present invention disclose a computer-implemented method, for provisioning cloud resources, the computer-implemented method comprising: receiving a set of potential cloud resource providers; predicting a performance for a distributed workload on each potential provider of the set according to a machine learning model; injecting fault into the set of potential cloud resource providers, wherein the fault is utilized to create a system intervention, and wherein the fault ensures that the system intervention is carried out on a network in predetermined system; measuring an impact of the injected fault upon system performance; and provisioning the distributed workload among the potential cloud resource providers according to dynamic conditions output by the set of potential cloud resources based on the measured impact of the injected fault.

DETAILED DESCRIPTION

Figure 1:
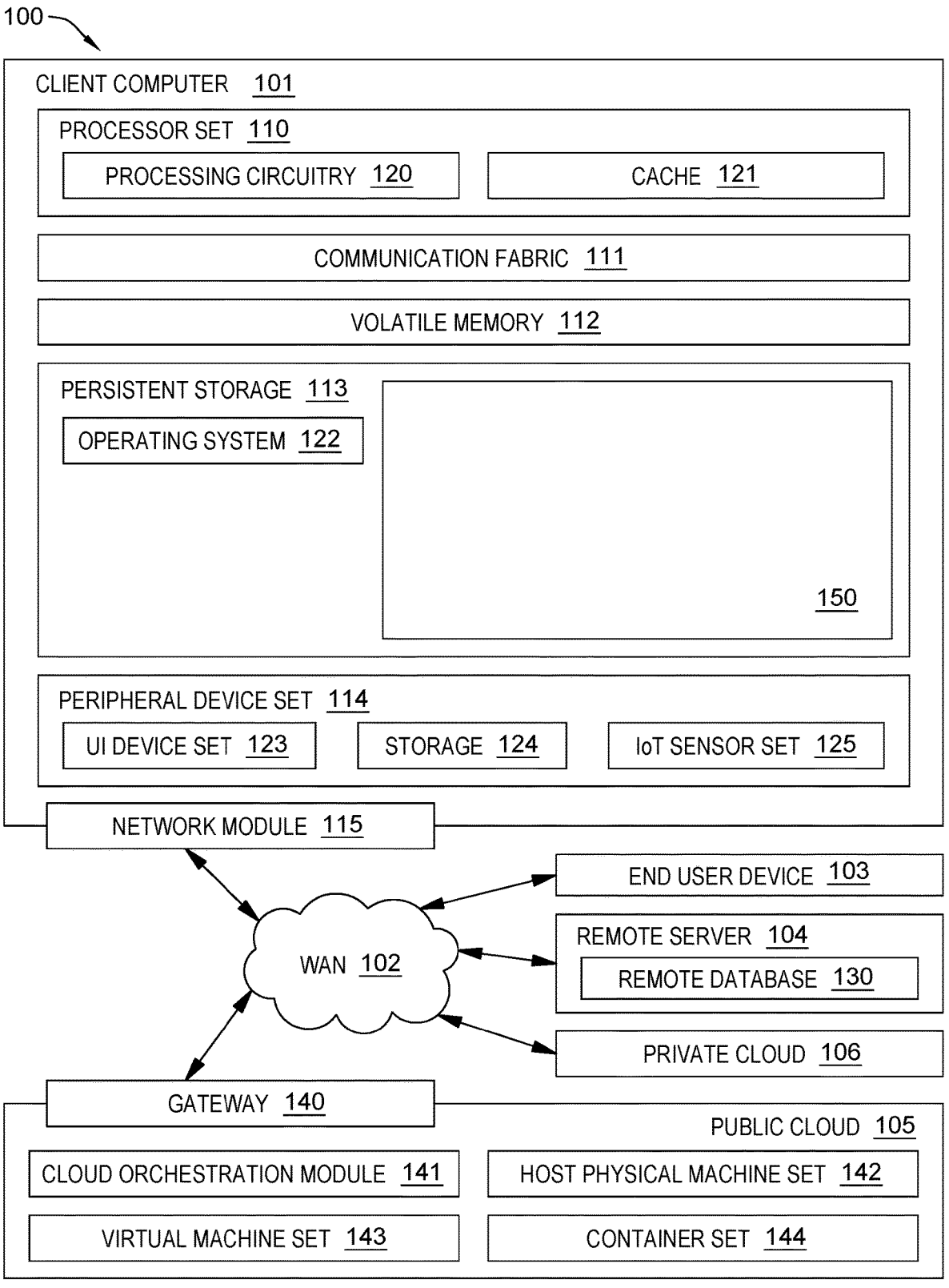
FIG. 1 is a functional block diagram illustrating a distributed data processing environment, a resource optimization program, in accordance with an embodiment of the present invention.

Embodiments of the present invention recognize that, increasingly, workloads (i.e., jobs) are now being executed using cloud technology due to its elasticity, common virtualization, and runtime abstraction (e.g., via Kubernetes), and low maintenance cost. Further, embodiments of the present invention recognize that these workloads require multiple nodes and multiple graphics processing units (GPUs) to achieve high scalability and meet increased demands. Additionally, embodiments of the present invention recognize that there are multiple cloud providers that allow users/customers to create virtualized resourced for executing distributed workload. However, embodiments of the present invention recognize that customers want to avoid vendor (i.e., cloud provider) lock-in due to cost, performance and resiliency requirements. For example, (i) spot instances are cheaper and involve dynamic pricing, thus using spot instances for training can reduce training cost by an order of magnitude, and (ii) Other considerations such as disaster recovery or performance degradation. Further, depending on application characteristics, embodiments of the present invention recognize that, one cloud provider may be more suitable than other. For example, cloud provider A (CP-A) may have the latest generation of GPUs with mediocre network whereas CP-B can offer older generations of GPUs with extremely high performing network.

Therefore, based on at least the problems stated above, embodiments of the present invention recognize that it is important to develop a system and a method for predicting performance of distributed jobs to identify which cloud provider is best suited to (i) execute the training job, and (ii) migrate the training job to another CP based on the evolving conditions (measured through the observability data) to meet service level objectives (SLOs) and/or service level agreements (SLAs) (e.g., cloud storage service level agreements). However, embodiments of the present invention recognize that current techniques require gathering of observability data and execution profile for the training job for all cloud providers across all configurations (application as well as infrastructure related configuration) and failure modes which is not scalable and too costly.

Embodiments of the present invention improve the art and solve at least the issues stated above by allocating cloud computer resources for achieving the best performance of a distributed job in multi-cloud computer or single cloud computer without observing the workload on each cloud provider. More specifically, embodiments of the present invention separate the learning, required in cloud technology, into two models: (i) system model (i.e., infrastructure characteristics) using a profiler, and (ii) application sensitivity to various infrastructure parameters and faults using interventions. Further, embodiments improve the art and solve at least the issues stated above by (i) receiving a set of potential cloud resource providers; (ii) predicting the performance of a distributed workload on each potential provider of the set according to a system model database; and (iii) provisioning the distributed workload among the potential cloud resource providers according to the performance.

Implementation of embodiments of the invention may take a variety of forms, and exemplary implementation details are discussed subsequently with reference to the Figures (i.e., FIG. 1-FIG. 4).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as resource optimization program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, central processing unit (CPU) power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 improves the art and solve at least the issues stated above by allocating cloud computer resources for best performance of a distributed job in Multi-Cloud Computer without observing workload on each cloud provider. More specifically, component 150 may separate the learning, required in cloud technology, into two models: (i) learning the system model (i.e., infrastructure characteristics) using a profiler (system model), and (ii) learning the application sensitivity to various infrastructure parameters and faults using system-wide interventions (application sensitivity model). Additionally, in various embodiments, component 150 emulates a less capable cloud instance on the most capable cloud instance. For example, component 150 utilizes fault injector(s) to create a system intervention, wherein the fault injector(s) for system intervention ensures that a particular intervention (e.g., network throttling) is carried out on every link of the network in the system. Further, component 150 improve the art and solve at least the issues stated above by (i) receiving a set of potential cloud resource providers; (ii) predicting a performance for a distributed workload on each potential provider of the set according to a system model database; and (iii) provisioning the distributed workload among the potential cloud resource providers according to the performance of the cloud resource providers. A system intervention may be any measurable parameter, condition, and/or limitation that is known and understood in the art. One or more system interventions may create real world conditions that component 150 utilizes to identify performance, system errors, and/or monitoring blind spots.

In various embodiments, component 150 utilizes chaos engineering, via system intervention, to train the two models mentioned above (i.e., system model and application sensitivity model). For example, component 150 may inject fault to mimic the different cloud provider characteristics, wherein the system-wide intervention alleviates the need to execute the workload on each cloud provider with different fault conditions (i.e., the use of chaos engineering to make provisioning and migration decisions). Such a methodology reduces (i) the time to train the model there is no longer a need to implement tools to build cloud provider-specific fault injectors (fault 213) to conduct system interventions 214, and (ii) the cost of training such model (i.e., no need to conduct system-wide intervention (system interventions 214 for each cloud provider).

In various embodiments, component 150 provisions cloud resources. Component 150 may receive a set of potential cloud resource providers, predict a performance for a distributed workload on each potential provider of the set according to a system model database, and provision the distributed workload among the potential cloud resource providers according to the performance. Additionally, component 150 may determine a profile for a new potential cloud resource provider and predict the performance for the distributed workload using the profile. Further, component 150 may generate a profile for each known cloud resource provider, inject a fault into a system including one of the known cloud resource providers, measure the impact of the injected fault upon system performance, train a machine learning model using the impact, and predict the performance according to the machine learning model, wherein the predicting comprises collecting data on system utilization during a training job, and predicting the performance using the data and the machine learning model. Moreover, component 150 may determine that the performance fails to a threshold requirement and alters the provisioning according to the performance. In various embodiments, based on the measured and output results, component 150 identifies a plurality of performance metrics and a plurality of service attributes (e.g., service level agreement (SLA) and service level objective (SLO) transferability, and/or any other combination of service level attributes known and understood in the art).

Figure 2A:
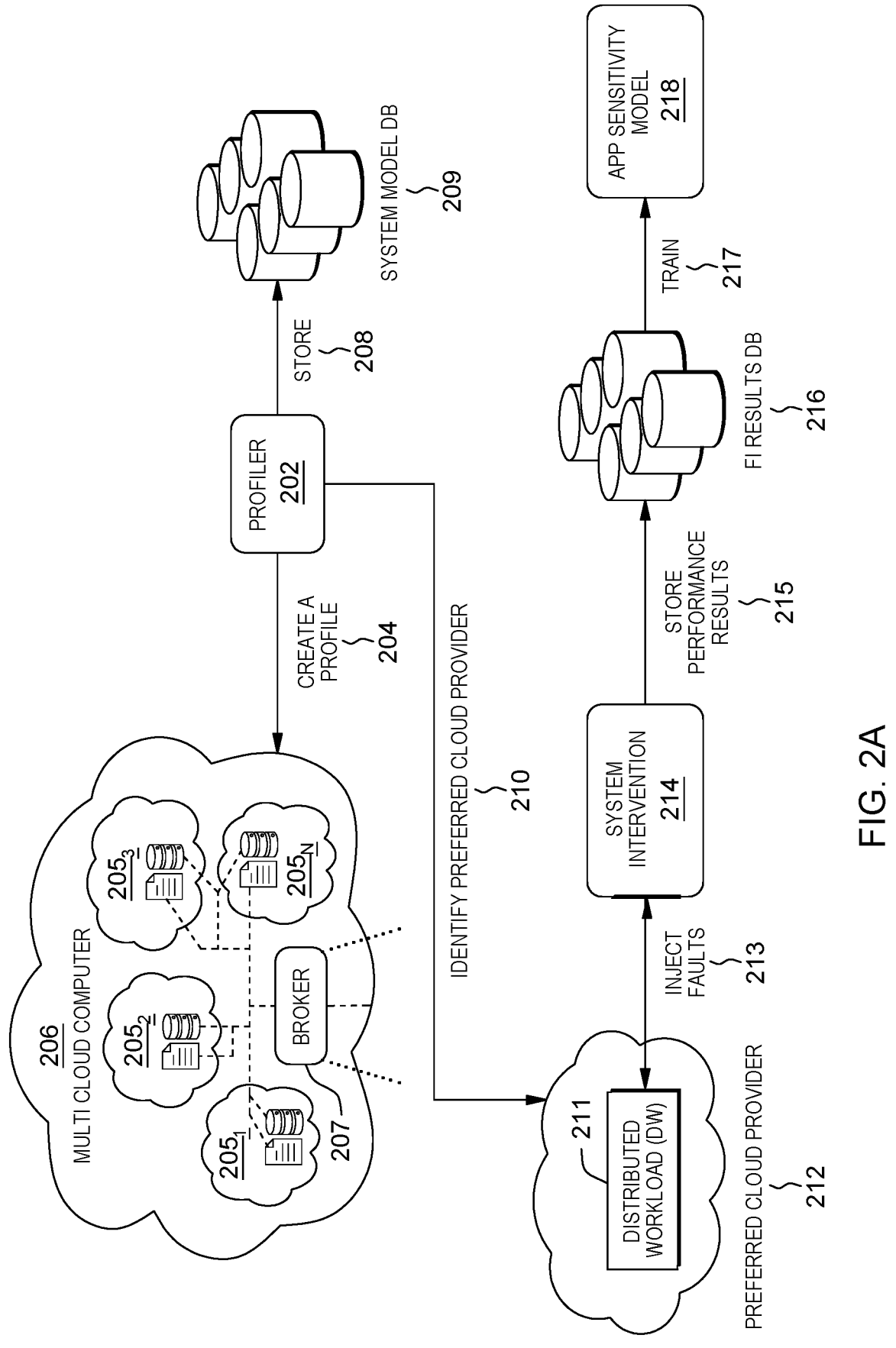
FIG. 2A illustrates a functional block diagram and operational steps of the resource optimization program, on a server computer within the distributed data processing environment of FIGS. 1A, in accordance with an embodiment of the present invention.

FIG. 2A is a functional block diagram illustrating a distributed data processing environment of component 150 in an offline phase, generally designated 200, in accordance with one embodiment of the present invention. The term "distributed" as used in this specification describes a computer system that includes multiple, physically distinct devices that operate together as a single computer system. FIG. 2A provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 150 profiles 204 cloud provider 205$_{1-N}$, herein after cloud provider(s) 205 to understand infrastructure characteristics. As used herein, N represents a positive integer, and accordingly the number of scenarios implemented in a given embodiment of the present invention is not limited to those depicted in FIG. 2A. In this embodiment, the profiling is executed offline or on demand (if the CP is unknown to the system). In other embodiments the profiling may be executed online or on demand. More specifically, component 150, through profiler 202, may create a profile 204 of the infrastructure for each cloud provider(s) 205 within multi-cloud computer 206, via broker 207. Component 150, via profiler 202 may collect infrastructure details, from broker 207 and/or directly from cloud provider(s) 205, such as compute (#core, #frequency, size of L1, L2, LLC cache, memory size and frequency), network (latency, bandwidth, bisection bandwidth), and storage (IOPs, latency, read/write bandwidth) data. In various embodiments, profiling comprises running network benchmarks (such as NCCL), compute benchmarks (such as GEMM) and I/O benchmarks (such as index of refraction (IOR)), and machine learning framework kernels (from their test suite). In the depicted embodiment, component 150 stores the collected and/or received benchmark results and specifications 208 to system model database 209.

In the depicted embodiment, component 150 identifies 210, via profiler 202, the most capable cloud provider (i.e., preferred cloud provider (PCP) 212), or use a local staging cluster, based on the collected and/or received benchmark performance to execute distributed workload 211. In various embodiments, component 150 identifies PCP 212), or use a local staging cluster, based on the collected and/or received benchmark performance to execute distributed workload (DW) 211, wherein DW 211 may be one batch or an iteration of the training job in a case of a machine learning (ML) job or a launch application program interface (API) requests in case of service-based workloads to understand the relationship between the workload performance and the infrastructure characteristics. In various embodiments, component 150 does not need to execute the whole training job as individual iterations or batch capture the training job characteristics. The most capable cloud provider, referred to as preferred cloud provider (PCP 212) is the cloud provider or cloud provider configuration with the highest ranked results, wherein the ranked results are based on analyzed benchmarks (e.g., CPU benchmarks, storage benchmarks, etc.) associated with executed distributed workload 211. PCP 212 may be either a single cloud or multiple cloud computer configuration. In various embodiments, the measures and/or analyzed benchmarks are predetermined. In other embodiments, the measures and/or analyzed benchmarks are selected by a user based on preferences of the user.

In the depicted embodiment, component 150 injects fault 213 into distributed workload 211 to generate or implemented system intervention 214, and stores the performance results 215 from the injected faults to a database (e.g., fault injector results database 216). System intervention 214 may be achieved through fault injection, wherein component 150 leverages the chaos to make decisions (e.g., analyzing the generated dynamic conditions of distributed workload 211 associated with injected fault 213 to identify and determine distributed workload provisions). In various embodiments, component 150, performs network, compute, and storage related system-wide interventions (via fault injections) to understand the impact of (i) reduced performance (e.g., reduction in network bandwidth that mimics migration of the workload from cloud provider 205₁ to cloud provider 205₂) and (ii) faults (e.g., failure of the spot instance). In the depicted embodiment, component 150 trains 217 a machine learning (ML) model (i.e., application sensitivity model 218) that predicts the performance (i.e., runtime) using the collected data from system-wide interventions.

Figure 2B:
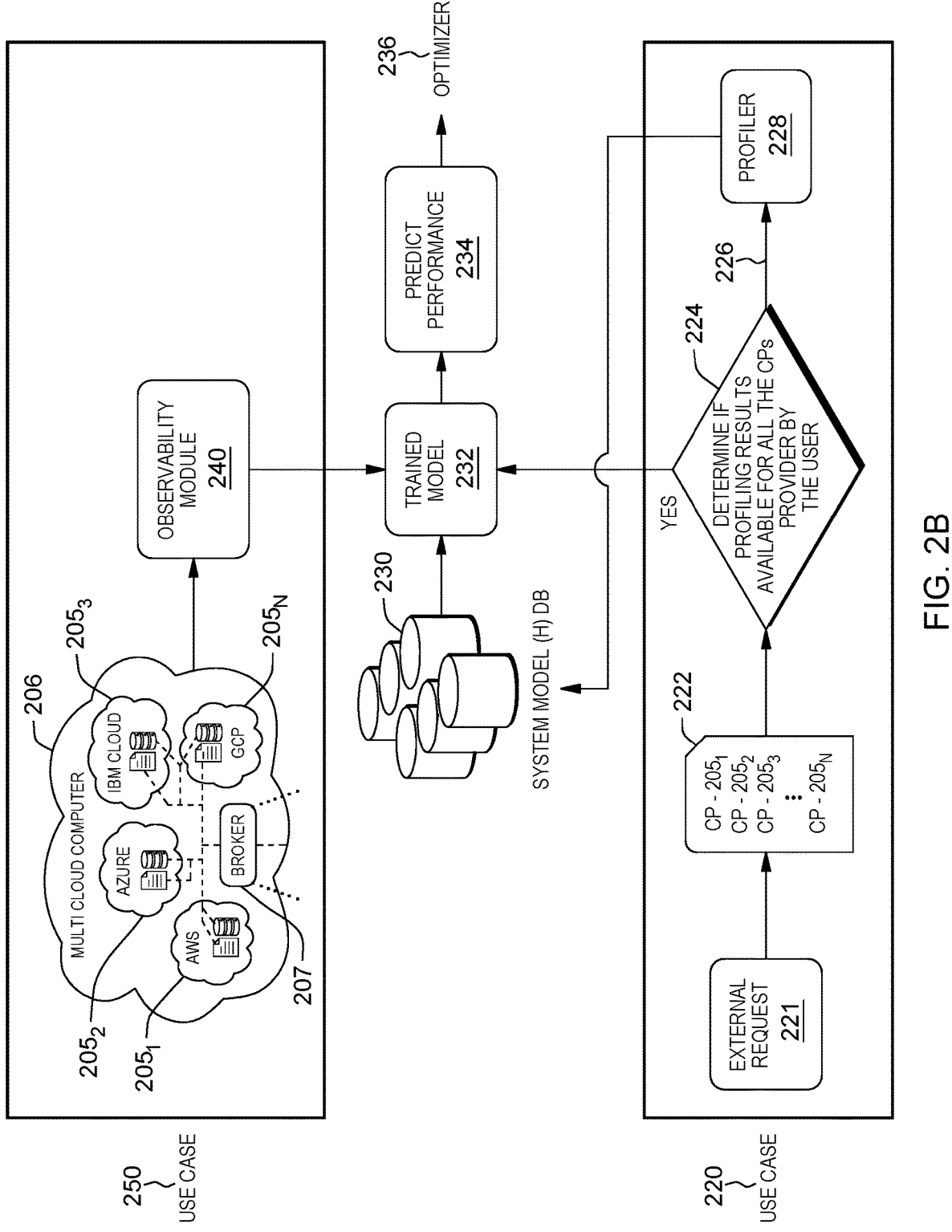
FIG. 2B illustrates a functional block diagram and operational steps of the resource optimization program, on a server computer within the distributed data processing environment of FIGS. 1, in accordance with an embodiment of the present invention.

FIG. 2B is a functional block diagram illustrating a distributed data processing environment of component 150 in an online phase, generally designated 200, in accordance with one embodiment of the present invention. The term "distributed" as used in this specification describes a computer system that includes multiple, physically distinct devices that operate together as a single computer system. FIG. 2B provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, within use case 220, component 150 receives an external request 221, wherein component 150 receives or retrieves, from an optimizer or user, a list of desired cloud providers (desired list) 222 that the optimizer or user desire to use. In depicted embodiment, desired list 222 comprises cloud provider 205₁₋N, wherein cloud provider 205₁₋N may each encompass both a cloud provider and a cloud configuration. Further, in the depicted embodiment, component 150 determines 224 if profiling results for cloud providers 205 in desired list 222 (i.e., has profiling benchmark results for all CPs) are available (e.g., stored/previously used). If component 150 determines, from previously stored data (e.g., metadata and/or a profile), that component 150 has profiling results for cloud providers 205 on desired list 222 (Yes step) then component 150 advances to predicting workload performance 234. However, in the depicted embodiment, if component 150 determines that component 150 does not have profiling results for cloud providers 205 on desired list 222 (No step 226) then component 150 executes profiler 228 to generate and/or retrieve benchmark results for one or more of the cloud providers that is missing profiling results. In various embodiments, if the component 150 has previously seen all cloud providers (i.e., has profiling benchmark results for all CPs) then component 150 advances to predicting workload performance 234 otherwise component 150 executes the profiler to generate profiling results for cloud providers that are missing the profiling results. In the depicted embodiment, component 150 predicts, using system model database 230 and/or trained model 232 (see FIG. 3), the distributed workload performance of each cloud provider on list 222 and sends (i.e., feeds) the workload performance predictions to optimizer 236. In the depicted embodiment, component 150, via optimizer 236, makes the provisioning or migration decision.

In the depicted embodiment, particularly use case 250, component 150, via observability module 240, utilizes observability tools to collect monitoring (i.e., observability) data (e.g., execution time of ML iteration or API request, system/network utilization, etc.) from cloud providers 205, via broker 207, in multi-cloud computer 206. Multi-cloud computer 206 may represent a single cloud computer in some embodiments. In various embodiments, component 150, via observability module 240 collects system utilization (e.g., network, CPU, memory, GPU etc.) and the execution time of each minibatch/iteration time of the training job associated with cloud providers 205 in multi-cloud computer 206. In the depicted embodiment, based on the collected observability data, component 150 utilizes trained model 232 to predict the performance 234 of each cloud provider(s) 205 for the training job for future iterations/minibatch, wherein the observability data is feed into trained model 232. The prediction results can then be used to determine if the job is going to meet predetermined SLA/SLO, if not, optimizer 236 can be alerted, via an API, to schedule a job on an alternative cloud provider(s) 205.

Figure 3:
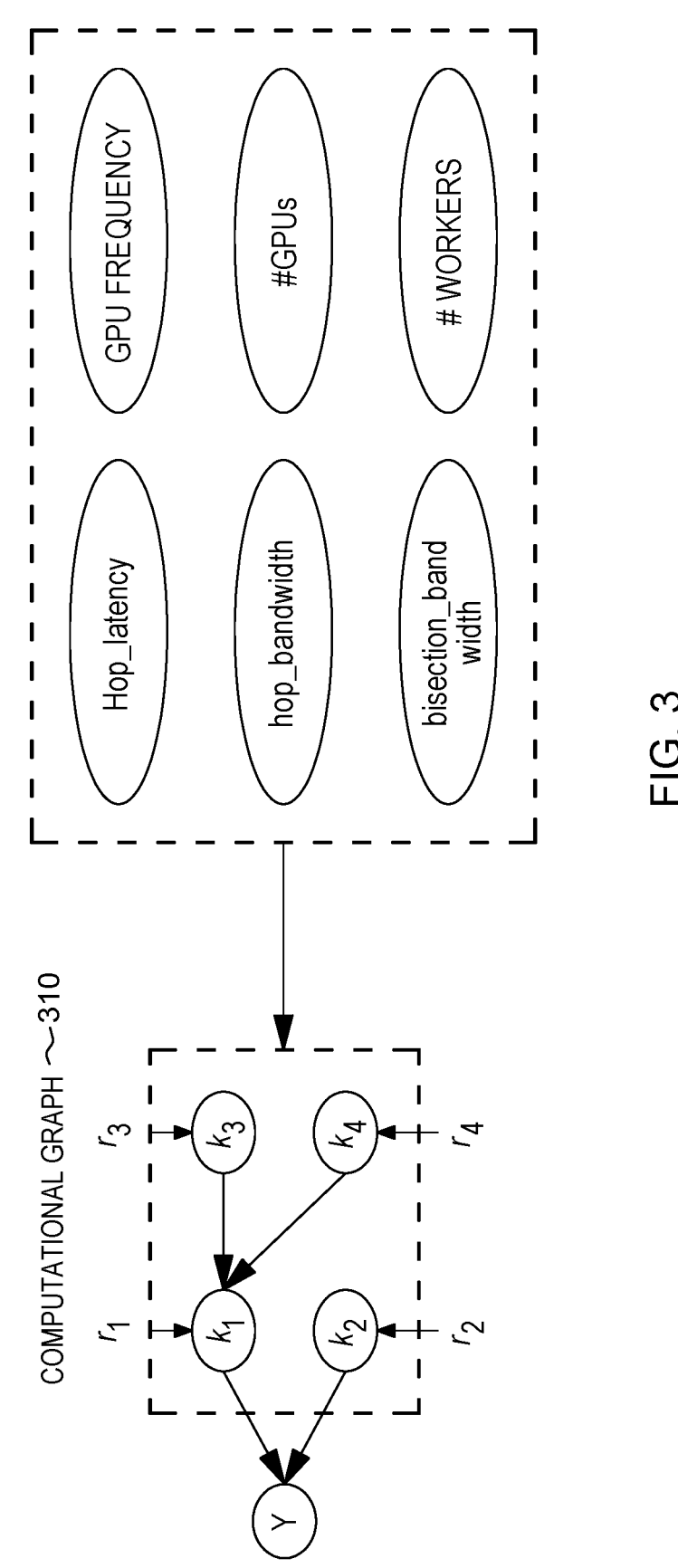
FIG. 3 illustrates one example, in accordance with an embodiment of the present invention.

FIG. 3 is an example illustrating model formalization. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Trained model 232 is formulized utilizing hardware parameters (H) 301 and computational graph 310. H 301 may act as a confounder. In the depicted example of model formalization, for trained model 232, H 301 comprises hop_latency, GPU frequency, hop_bandwidth, number of GPUs (#GPUs), bisection_bandwidth, and number of workers (#workers). Hop latency is the average time it takes for a packet to traverse a random link on the network; hop bandwidth is the average bandwidth available on a network channel for a random hop on the network; GPU frequency the clock frequency of the GPU; and number of workers is the number of computational nodes that are involved in running the distributed workload. However, in various embodiments, H 301 comprise hop_latency, GPU frequency, hop_bandwidth, number of GPUs (#GPUs), bisection_bandwidth, number of workers (#workers), and any other hardware parameters known and understood in the art. H 301 may be different for each cloud provider. H 301 may be estimated using system profiling (e.g., hop_latency) and job submission script (e.g., #workers needed). In the depicted embodiment, computational graph 310 executes on a cloud provider (parameterized using H 301). The end-to-end execution time of the computation graph 310 is Y. The computational graph is a broad abstraction that can model a machine learning training job or a cloud native application or a batch workload. In the depicted embodiment, the computation graph comprises of n=4 kernels each of which takes $k_i$ time units (e.g., $k_1$-$k_4$) to complete and is repeated $r_i$ times (e.g., $r_1$-$r_4$). In various embodiments, $k_i$ time units encompass execution time of the ith layer and $r_i$ times encompasses the repetitions of kernel(s) in ith layer (observed and known). Component 150 separates the learning, required in cloud technology, into two models: (i) system model (i.e., infrastructure characteristics) using a profiler, and (ii) application sensitivity to various infrastructure parameters and faults using system-wide interventions. Application model, represented by Equation 1, informs sensitivity of overall runtime to kernel execution time. Whereas, system model, represented by Equations 2A and 2B, inform sensitivity of kernel execution time to hardware parameters, wherein the distributions if Equation 2B are learned using system-wide interventions. $f$ is a function that estimates the end-to-end runtime of the distributed workload using parameters $k_i$ and $r_i$; similarly, $g_{k_i}$ is a function that predicts the execution time of kernel $k\_i$. It should be noted that the models may be slightly more complicated as component 150 models interference for SLOs.

$$Y = f(k_1, k_2, k_3, k_4, r_1, r_2, r_3, r_4,) \qquad \text{Equation 1}$$

$$k_i = g_{k_i}(r_i, H) \qquad \text{Equation 2A}$$

$$J = P(Y|k_1k_2, H) \times P(k_1|r_1, k_3, k_4, H) \times \qquad \text{Equation 2B}$$

$$P(k_2|r_2, H) \times P(k_3|r_3, H) \times P(k_4|r_4, H)$$

Figure 4:
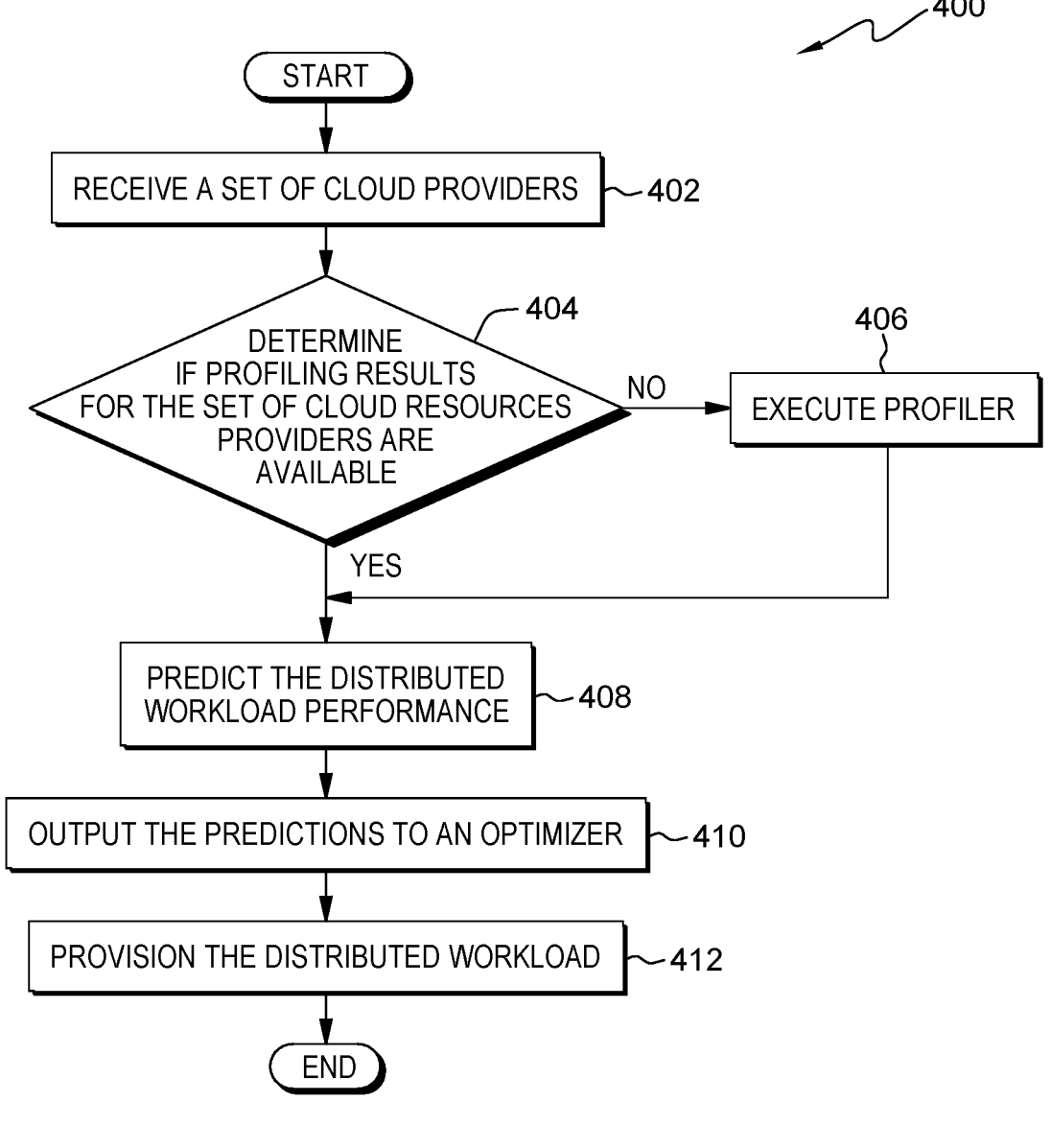
FIG. 4 illustrates operational steps of the resource optimization program, on a server computer within the distributed data processing environment of FIGS. 1, for enhancing advertising effectiveness in a virtual environment in accordance with an embodiment of the present invention.

FIG. 4 illustrates operational steps of component 150, generally designated 400, in communication with client computer 101, remote server 104, private cloud 106, EUD

103, and/or public cloud 105, within distributed data processing environment 100, for enhancing advertising effectiveness in a virtual or mixed reality environment, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, component 150 receives a set of cloud resource providers. In various embodiments, component 150 receives and/or retrieves a set (i.e., list) of potential cloud resource providers from an optimizer, database, or user.

In step 404, determines if profiling results for the set of cloud resources providers are available. In the depicted embodiment, if component 150 determines, based on previously stored data (e.g., metadata and/or a profile, that profiling results (i.e., profiling benchmark results) for the cloud providers in the received set are available/stored in a database (e.g., system model database) (Yes step) then component 150 advances to step 408. However, in the depicted embodiment, if component 150 determines that profiling results for the cloud providers in the received set are not available for one or more of the cloud resource providers (No step) then component 150 advances to step 406.

In step 406, component 150 executes a profile. Component 150 may execute a profiler to generate and/or retrieve benchmark results for one or more of the cloud providers that is missing profiling results. In the depicted embodiment, responsive to generating and/or retrieve benchmark results for one or more of the cloud providers that is missing profiling results, component 150 feeds the generating and/or retrieve benchmark results into a system model database.

In step 408, component 150 predicts the distributed workload performance. In various embodiments, component 150 predicts a performance for a distributed workload on each potential provider of the set according to the system model database.

In step 410, component 150, outputs the predictions to an optimizer. In various embodiments, responsive to predicting the distributed workload performance on each cloud provider using the system model database, component 150 outputs the predictions to the optimizer or user.

In step 412, component 150 provisions the distributed workload. In various embodiments component 150 provision the distributed workload among the potential cloud resource providers based on the predicted performance.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for provisioning cloud resources, the computer-implemented method comprising:
  receiving a set of potential cloud resource providers;
  predicting a performance for a distributed workload on each potential provider of the set according to a machine learning model;
  injecting fault into the set of potential cloud resource providers, wherein the fault is utilized to create a system intervention, and wherein the fault ensures that the system intervention is carried out on a network in predetermined system, and wherein the fault is injected to mimic the different cloud provider characteristics, wherein a system-wide intervention alleviates the need to execute the workload on each cloud provider with different fault conditions;
  measuring an impact of the injected fault upon system performance; and
  provisioning the distributed workload among the potential cloud resource providers according to dynamic conditions output by the set of potential cloud resources based on the measured impact of the injected fault.

2. The method according to claim 1, further comprising:
  determining a profile for a new potential cloud resource provider; and
  predicting the performance for the distributed workload using the profile.

3. The method according to claim 1, further comprising:

outputting a ranking of results of the set of potential cloud providers; and selecting a preferred cloud provider or a cloud provider configuration with ranked results that are above a predetermined threshold, wherein the ranked results are based on analyzed benchmarks associated with an executed distributed workload, and wherein the preferred cloud provider may be either a single cloud or multiple cloud computer configuration.

4. The method according to claim 1, further comprising:

generating a profile for each known cloud resource provider;

training the machine learning model using the impact; and predicting the performance according to the machine learning model.

5. The method according to claim 4, wherein the predicting comprises:

collecting data on system utilization during a training job; and predicting the performance using the data and the machine learning model.

6. The method according to claim 1, further comprising:

determining that the performance fails to a threshold requirement; and altering the provisioning according to the performance.

7. The method according to claim 1, wherein the machine learning model comprises a system model database and an application sensitivity model.

8. A computer system for provisioning cloud resources, the computer system comprising:

one or more computer processors;

one or more computer readable storage devices;

program instructions stored on the one or more computer readable storage devices for execution by at least one of the one or more computer processors, the stored program instructions comprising:

program instructions to receive a set of potential cloud resource providers;

program instructions to predict a performance for a distributed workload on each potential provider of the set according to a machine learning model;

program instructions to inject fault into the set of potential cloud resource providers, wherein the fault is utilized to create a system intervention, and wherein the fault ensures that the system intervention is carried out on a network in predetermined system, and wherein the fault is injected to mimic the different cloud provider characteristics, wherein a system-wide intervention alleviates the need to execute the workload on each cloud provider with different fault conditions;

program instructions to measure an impact of the injected fault upon system performance; and program instructions to provision the distributed workload among the potential cloud resource providers according to dynamic conditions output by the set of potential cloud resources based on the measured impact of the injected fault.

9. The computer system according to claim 8, further comprising:

program instructions to determine a profile for a new potential cloud resource provider; and program instructions to predict the performance for the distributed workload using the profile.

10. The computer system according to claim 8, further comprising:

program instructions to output a ranking of results of the set of potential cloud providers; and program instructions to select a preferred cloud provider or a cloud provider configuration with ranked results that are above a predetermined threshold, wherein the ranked results are based on analyzed benchmarks associated with an executed distributed workload, and wherein the preferred cloud provider may be either a single cloud or multiple cloud computer configuration.

11. The computer system according to claim 8, further comprising:

program instructions to generate a profile for each known cloud resource provider;

program instructions to train the machine learning model using the impact; and program instructions to predict the performance according to the machine learning model.

12. The computer system according to claim 11, wherein the predicting comprises:

program instructions to collect data on system utilization during a training job; and program instructions to predict the performance using the data and the machine learning model.

13. The computer system according to claim 8, further comprising:

program instructions to determine that the performance fails to a threshold requirement; and program instructions to alter the provisioning according to the performance.

14. The computer system according to claim 8, wherein the machine learning model comprises a system model database and an application sensitivity model.

15. A computer program product for implementing additive manufacturing, the computer program product comprising:

one or more computer readable storage devices and program instructions stored on the one or more computer readable storage devices, the stored program instructions comprising:

program instructions to receive a set of potential cloud resource providers;

program instructions to predict a performance for a distributed workload on each potential provider of the set according to a machine learning model;

program instructions to inject fault into the set of potential cloud resource providers, wherein the fault is utilized to create a system intervention, and wherein the fault ensures that the system intervention is carried out on a network in predetermined system, and wherein the fault is injected to mimic the different cloud provider characteristics, wherein a system-wide intervention alleviates the need to execute the workload on each cloud provider with different fault conditions;

program instructions to measure an impact of the injected fault upon system performance; and program instructions to provision the distributed workload among the potential cloud resource providers according to dynamic conditions output by the set of potential cloud resources based on the measured impact of the injected fault.

16. The computer program product according to claim 15, further comprising:

program instructions to determine a profile for a new potential cloud resource provider; and program instructions to predict the performance for the distributed workload using the profile.

17. The computer program product according to claim 15, further comprising:

program instructions to output a ranking of results of the set of potential cloud providers; and program instructions to select a preferred cloud provider or a cloud provider configuration with ranked results that are above a predetermined threshold, wherein the ranked results are based on analyzed benchmarks associated with an executed distributed workload, and wherein the preferred cloud provider may be either a single cloud or multiple cloud computer configuration.

18. The computer program product according to claim 15, further comprising:

program instructions to generate a profile for each known cloud resource provider;

program instructions to train the machine learning model using the impact;

program instructions to predict the performance according to the machine learning model;

program instructions to collect data on system utilization during a training job; and program instructions to predict the performance using the data and the machine learning model.

19. The computer program product according to claim 15, further comprising:

program instructions to determine that the performance fails to a threshold requirement; and program instructions to alter the provisioning according to the performance.

20. The computer program product according to claim 15, wherein the machine learning model comprises a system model database and an application sensitivity model.

\* \* \* \* \*